United States Patent [19]

Cardis et al.

[11] Patent Number: 5,264,004
[45] Date of Patent: Nov. 23, 1993

[54] MULTIFUNCTIONAL ASHLESS DETERGENT ADDITIVES FOR FUELS AND LUBRICANTS

[75] Inventors: Angeline B. Cardis, Florence; Arjun K. Goyal, Woodbury, both of N.J.; Carl E. Shanholtz, Ft. Ashby, W. Va.; Virginia C. Wiszniewski, Voorhees, N.J.

[73] Assignee: Mobil Oil Corporation, Fairfax, Va.

[21] Appl. No.: 933,167

[22] Filed: Aug. 21, 1992

Related U.S. Application Data

[62] Division of Ser. No. 781,449, Oct. 23, 1991, Pat. No. 5,160,649.

[51] Int. Cl.$^5$ .............................................. C10L 1/22
[52] U.S. Cl. ...................................... 44/331; 548/520
[58] Field of Search ........................... 44/331; 548/520

[56] References Cited

U.S. PATENT DOCUMENTS

| | | | |
|---|---|---|---|
| 4,981,493 | 1/1991 | Sung | 44/331 |
| 5,069,684 | 12/1991 | Blain et al. | 44/331 |
| 5,160,349 | 11/1992 | Cardis et al. | 44/331 |
| 5,160,649 | 11/1992 | Cardis et al. | 252/47.5 |

*Primary Examiner*—Jacqueline V. Howard
*Attorney, Agent, or Firm*—Alexander J. McKillop; Malcolm D. Keen; Jessica M. Sinnott

[57] ABSTRACT

An ashless detergent additive having antioxidant and metal surface protection properties for lubricants or fuels is made from a Mannich condensation reaction between a hydrocarbylbissuccinimide, such as a dimer of a polyisobutenylsuccinimide (derived from tetraethylenepentamine), an aldehyde, such as formaldehyde, and a heteroatom substituted benzoic acid such as salicylic acid, thiosalicylic acid or aminosalicylic acid.

11 Claims, No Drawings

MULTIFUNCTIONAL ASHLESS DETERGENT ADDITIVES FOR FUELS AND LUBRICANTS

This is a division of copending application Ser. No. 07/781,449, filed on Oct. 23, 1991 now U.S. Pat. No. 5,160,649.

FIELD OF THE INVENTION

The invention relates to lubricant additives. Specifically, the invention relates to ashless detergent lubricant additives having antioxidant and antiwear properties.

BACKGROUND OF THE INVENTION

Under typical operating conditions, lubricants are subject to extremes of cold and hot temperatures. Ashless detergents are necessary for low temperature lubricant operations to prevent the formation of what is known as "cold sludge" which results from water present in the lubricant. During high temperature operation, antioxidant additives are necessary to prevent oxidative degradation of the lubricant. Oxidation of a lubricant can lead to the build-up of oil-soluble acids and lacquers and sludge which cause serious damage to engines and other lubricated systems. Typically, antioxidant additives are blended with lubricants in order to improve the stability of the lubricant and thereby enhance the ability of the oil to resist oxidation.

In formulating lubricants for use in marine environments, such as those used in marine diesel engine and steam turbine applications, special concern is directed to using lubricant additives which will inhibit acid catalyzed oxidation and, at the same time, promote good separation between oil and water. Otherwise, the water which unavoidably finds its way into the lubricant reservoir forms an emulsion and contaminates the lubricant; thus, for example, marine oils should be able to separate from water rather than form stable emulsions. Surface active compounds such as metal surface protectors are prone to impair the demulsifying properties of the oil. Accordingly, there is a need for dispersant with extra antiwear and anticorrosion properties while maintaining good water-to-oil separation.

SUMMARY OF THE INVENTION

This invention provides a lubricant additive which has multifunctional applications as an antioxidant and metal surface protector which is soluble in lubricants and promotes good water-oil separation.

The instant invention is directed to a reaction product, having multifunctional antioxidant and metal surface protection properties in lubricants and fuels; comprising, a reaction product of a hydrocarbylsuccinimide dimer, an aldehyde and a heteroatom substituted benzoic acid having the following structural formula:

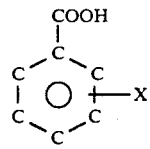

where X represents the heteroatomic group which is a hydroxyl, thiol or nitrogenous group.

The hydrocarbylsuccinimide dimer results from the reaction of two equivalent amounts of an hydrocarbylsuccinic anhydride with one molar amount of an alkylenepolyamine. The hydrocarbylsuccinimide dimer is represented by the following structural formula:

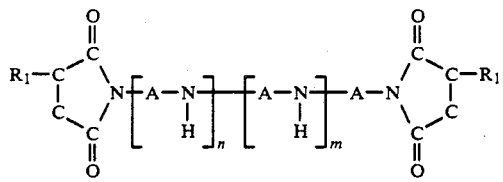

Where $R_1$ is a hydrocarbyl such as a monomer or polymer of an alkyl or alkenyl group containing 1 to 250 carbon atoms, preferably 12 to 220 carbon atoms. The alkenyl group is preferably aliphatic which can be saturated or unsaturated and may be straight chain or branched chain. A is an alkyl group containing 1 to 10 carbon atoms, n ranges from 0-7 and m ranges from 1 to 8.

The hydrocarbylsuccinic anhydrides are made by known techniques from the reaction of an olefin and maleic anhydride. Suitable olefins include ethylene, propylene, butylene, isobutylene, pentylene, heptylene, decylene, dodecylene, eicosene, higher olefinic hydrocarbons as well as polymers and copolymers made from any of the foregoing olefins. The olefin can also contain cyclic hydrocarbyl groups such as phenyl, naphthyl or alicycle. In order for the final product to have the solubility properties necessary for beneficial emulsivity in lubricants the polyalkenyl group should have an average molecular weight ranging from 140 to 3000, preferably from 140 to 2500, more specifically, from 140 to 2000. Hence, although polyisobutylene is a particularly preferred substituent, other substituents can be polypropylene, other polyolefins, as well as monomeric olefins such as dodecenyl.

The alkylenepolyamines from which the hydrocarbyl succinimide dimers are derived can be represented by the structural formula:

where A is an alkylene group, n and m are integers where n ranges from 0 to 7 and m ranges from 1 to 8. Specific representative examples of suitable alkylenepolyamines from which the hydrocarbylsuccinimides are derived include ethyleneamines such as diethylenetriamine, triethylenetetraamine, tetraethylenepentamine and pentaethylenehexamine, higher polyethylenepolyamines and mixtures thereof. Other alkylenepolyamines and polyalkylene polyamines i.e., polypropylene polyamines can be employed.

Additionally contemplated polyamines are the aromatic polyamines, for example phenylenepolyamines in which there is at least one aromatic group substituted directly onto an amine group or in which the alkylene group is part of an aromatic system, an example of a suitable phenylenepolyamine is aminophenylenediamine. It is contemplated that heterocyclic amines can also be used. Suitable heterocyclic amines are characterized by the presence of an amine bound to a cyclic system containing at least one heteroatom which is oxygen, nitrogen or sulfur. Such a heterocyclic amine will be part of the aromatic polyamine or alkylenepolyamine, either as a substituent of an amine group or substituted onto the alkylene group. An example of a suitable heterocyclic amine is diaminoethylpiperazine. Mixtures of any of these amines can also be used successfully.

The heteroatom substituted benzoic acid reactant has the following structural formula:

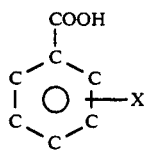

where X is the heteroatomic group which is a hydroxyl, thiol or a nitrogenous group. Where X is a nitrogenous group there will be two substituents such that the nitrogenous group is primary ($NH_2$) or secondary ($NHR_2$). When the nitrogenous group is secondary the substituent of the nitrogen atom, represented by $R_2$, is an alkyl or alkenyl gruop containing 1 to 20 carbon atoms.

One or more other substituent groups can be bonded to the benzene nucleus of the benzoic acid such as hydrocarbyl groups, i.e., alkyl, aryl, alkenyl, aralkyl or alkaryl. The hydrocarbyl group can contain 1 to 60 carbon atoms. It is preferable that the ortho or para position of the salicylic acid be unsubstituted so that at least one of these positions is available for reaction. Alternatively, the reaction can occur at the heteroatom.

Certain aldehydes which are suitable can be represented by the following structural formula:

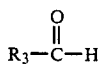

where $R_3$ is a hydrogen atom or a hydrocarbon group containing 1 to 60 carbon atoms which may be alkyl, aryl, alkylaryl or arylalkyl. The hydrocarbon groups can also contain at least one heteroatom such as an oxygen atom, sulfur atom or nitrogen atom. Typical compounds would be, but are not limited to, the following examples which include formaldehyde, butylaldehyde, salicylaldehyde, acetaldehyde, propionaldehyde, benzaldehyde, hexaldehyde and heptaldehyde. A formaldehyde precursor such as paraformaldehyde, a linear poly(oxymethylene glycol), can also be used. Although ketones may be slower reacting it is believed that they will be suitable reactants. Ketones include acetone, diethylketone, methyl-ethyl-ketone, and 2-ethylhexanone. These compounds are readily available from commercial sources or are easily made using known methods.

In conducting the synthesis reaction, the polyalkenyl succinimide, aldehyde and heteroatom-substituted benzoic acid are reacted in mole ratio of succinimide to aldehyde to heteroatom-substituted benzoic acid respectively of between 1 to 0.1 to 0.1 and 1 to 4 to 4, preferably at a temperature of 80° C. to 200° C., at ambient pressure, under a non-reactive atmosphere for approximately 4 hours. The temperature of the reaction is at least 80° C., ranging from 80° C. to 155° C., preferably from 85° C. to 110° C. The salicylic acid thus reacts with the aldehyde and hydrocarbylsuccinimide in a Mannich condensation to form an ammonium salt. One equivalent amount of the acid will react with each equivalent amount of the succinimide. As this is a condensation reaction, the amount of water of reaction can be monitored to facilitate determining the completion of the reaction: one mole of water is formed for each mole of aldehyde reacted. The reaction is generally carried out in the presence of a solvent or diluent inert to the reactants which can effect azeotropic removal of the water of reaction Alternatively, a vacuum can be used to aid in the removal of the water. Preferably, however, a solvent is used and among those deemed suitable include toluene, benzene, xylenes, i.e. those specifically which would provide a reflux temperature range of at least 80° C. to 160° C. Optionally, the product can be filtered.

In one embodiment of the invention, when the reactants are combined in a ratio of 1 mole of hydrocarbyl bissuccinimide, to 1 mole of an aldehyde to 1 mole of heteroatom-substituted benzoic acid, the condensation reaction can occur on the aromatic nucleus of the benzoic acid as represented by the following structure.

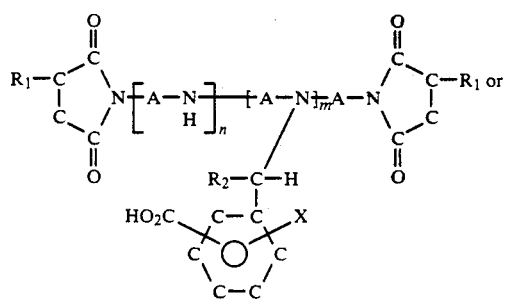

or the condensation can occur at the heteroatomic group of the heteroatom-substituted benzoic acid, as represented by the following structure:

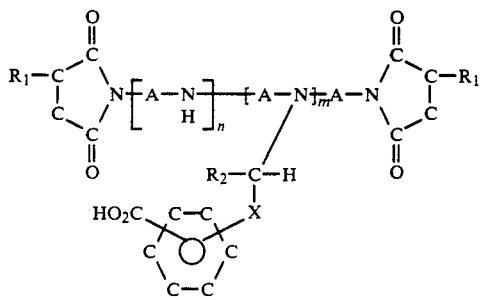

where $R_1$, $R_2$, A and X are as described above, n and m are integers where n is greater than 0 and n+m are at least 1, at most 4.

In the final product there is at least one basic nitrogen per carboxylate of the benzoic acid such that a positive charge resides on the nitrogen atom of the alkyleneamine. When the ratio of basic nitrogen to carboxylate is less than one, i.e, the reactants are combined in a molar ratio expressed in terms of moles of carboxylate per equivalent molar amounts of succinimide of about 1:1 to about 3:1, the positive charge will be distributed over all the basic nitrogens of the succinimide based on either a random distribution or relative basicities, i.e, the most basic nitrogen attracting the proton, or both. The charge distribution provides the important surface activity which makes the compound a successful metal surface protector.

The reaction products are blended with lubricants in a concentration of about 0.05 wt % to 15 wt %, preferably, from 0.1 wt % to 10 wt % by weight of the total composition.

The contemplated lubricants are liquid oils in the form of either a mineral oil or synthetic oil or mixtures thereof. Also contemplated are greases in which any of the foregoing oils are employed as a base.

In general, the mineral oils, both paraffinic and naphthenic and mixtures thereof can be employed as a lubricating oil or as the grease vehicle. The lubricating oils can be of any suitable lubrication viscosity range, for example, from about 45 SUS at 100° F. to about 6000 SUS at 100° F., and preferably from about 50 to 900 SUS at 100° F. These oils may have VI to 100 or higher.

Where the lubricant is employed as a grease, the lubricant is generally used in an amount sufficient to balance the total grease composition, after accounting for the desired quantity of the thickening agent, and other additive components included in the grease formulation. A wide variety of materials can be employed as thickening or gelling agents. These can include any of the conventional metal salts or soaps, such as calcium, or lithium stearates or hydroxystearates, which are dispersed in the lubricating vehicle in grease-forming quantities in an amount sufficient to impart to the resulting grease composition the desired consistency. Other thickening agents that can be employed in the grease formulation comprise the non-soap thickeners, such as surface-modified clays and silicas, aryl ureas, calcium complexes and similar materials. In general, grease thickeners can be employed which do not melt or dissolve when used at the required temperature within a particular environment; however, in all other respects, any material which is normally employed for thickening or gelling hydrocarbon fluids for forming greases can be used in preparing the aforementioned improved grease in accordance with the invention.

Where synthetic oils, or synthetic oils employed as the vehicle for the grease are desired in preference to mineral oils, or in mixtures of mineral and synthetic oils, various synthetic oils may be used. Typical synthetic oils include polyalphaolefins.

The lubricating oils and greases contemplated for blending with the reaction product can also contain other additives generally employed in lubricating compositions such as corrosion inhibitors, detergents, extreme pressure agents, viscosity index improvers, friction reducers, antiwear agents and the like. Representative of these additives include, but are not limited to phenates, sulfonates, imides, heterocyclic compounds, polymeric acrylates, amines, amides, esters, sulfurized olefins, succinimides, succinate esters, metallic detergents containing calcium or magnesium, barium, arylamines, hindered phenols, zinc dialkyl or diaryldithiophosphates and the like.

The additives are most effective when used in industrial applications, such as in circulation oils and steam turbine oils, gas turbines, both heavy-duty gas turbines and aircraft gas turbines. Other industrial lubricants which can benefit from the metal surface protective properties of the instant additive include way lubricants, mist oils and machine tool lubricants.

Other oils which will benefit from the invention are diesel engine oils, i.e., used in marine diesel engines, locomotives, power plants and high speed automotive diesel engines, gasoline burning engines and compressor oils.

Gear oils are another class of fluids which would benefit from the additives of the present invention. Typical of such oils are automotive spiral-bevel and worm-gear axle oils which operate under extreme pressures, load and temperature conditions, hypoid gear oils operating under both high speed, low-torque and low-speed, high torque conditions When the additives are utilized in fuels, the fuels contemplated are liquid hydrocarbon and liquid oxygenated fuels such as alcohols and ethers. In preparing a fuel composition the additive is added at a rate of between 25 and 500 lbs of additive per 1000 barrels of fuel. The liquid fuel can be a liquid hydrocarbon fuel or an oxygenated fuel or mixtures thereof. Liquid hydrocarbon fuels include gasoline, fuel oils, diesel fuels. Alcohol fuels include methyl and ethyl alcohols and ethers. It is to be understood that the liquid fuel composition described herein can also contain other materials, for example, co-corrosion inhibitors, i.e., antioxidants and the like can be used.

EXAMPLE 1

145.0 gm (0.050 mol) of a bis-succinimide of tetraethylenepentaamine bearing polyisobutylene substituents on each succinic moiety such that the average total molecular weight is 2900, 7.0 gm (0.051 mol) of salicylic acid, 1.5 gm (0.050 mol) of paraformaldehyde, and 50 mL of mixed xylenes charged to a reactor fitted with a mechanical stirrer, $N_2$ inlet, Dean-Stark moisture trap, and condenser. The mixture is heated to reflux at approximately 175° C. for 4 hours during which time 0.8 mL of water is collected (theoretically 0.9 mL). Solvent is removed via the Dean-Stark trap with a vigorous flow of $N_2$ to a final temperature of 210° C. The mixture is then removed to a vacuum oven and held at 20 mm Hg vacuum and 150° C. for 16 hr.

EXAMPLE 2

145.0 gm (0.050 mol) of a bissuccinimide of tetraethylenepentaamine bearing polyisobutylene substituents on each succinic moiety such that the average total molecular weight is 2900, 14.0 gm (0.101 mol) of salicylic acid, 3.0 gm (0.10 mol) of paraformaldehyde, and 50 mL of mixed xylenes are charged to a reactor fitted with a mechanical stirrer, $N_2$ inlet, Dean-Stark moisture trap, and condenser. The mixture is heated to reflux at approximately 160° for 6.25 hours during which time 1.8 mL of water is collected (theoretically 1.8 mL). The mixture is removed to a rotary evaporator, and the solvent is evaporatively distilled.

EXAMPLE 3

To 290 g (0.1 mol) of a bissuccinimide of tetraethylenepentamine bearing polyisobutylene substituents on each succinic acid moiety such that the average total molecular weight is 2900 is added 15.4 g (0.1 mol) of thiosalicylic acid and 3.3 g (0.11 mol) of formaldehyde, and 150 mL of toluene, in a 2 L reactor. The reactor is equipped with a mechanical stirrer, $N_2$ inlet, thermometer and condenser with Dean-Stark trap. The mixture is heated to 130° C. for 4 hours during which time 1.9 mL of water is azeotropically removed. Heating is continued for one additional hour after all the $H_2O$ evaporates. The solvent is removed by rotary evaporation and the resulting brown viscous liquid is filtered through celite.

EXAMPLE 4

To 290 g (0.1 mol) of bissuccinimide of tetraethylenepentamine bearing polyisobutylene substituents on each succinic acid moiety such that the average total molecular weight is 2900 is added 30.8 g (0.2 mol) of thiosalicylic acid and 6.3 g (0.21 mol) of formaldehyde, and 150 mL of toluene, in a 2 L reactor. The reactor is equipped with a mechanical stirrer, $N_2$ inlet, thermometer and condenser with Dean-Stark, trap. The mixture is heated to approximately 130° C. for 4 hours during which time water (3.5 mL) is azeotropically removed (3.8 mL of water theoretically). Heating is continued for an additional 1 hour after all the $H_2O$ evaporates. The solvent is removed by rotary evaporation and the resulting brown viscous liquid is filtered through celite.

EVALUATION OF THE PRODUCT

The reaction product, made in accordance with each of the foregoing examples, is blended in a concentration of 1 wt % in a 200 SUS paraffinic neutral mineral oil and evaluated for antioxidant performance in the Catalytic Oxidation Test at 325° F. for 40 and for 72 hours (see Table 1 and 2). The reaction products of Examples 3 and 4 are blended in a concentration of 4 wt. % in a fully formulated marine diesel lubricant and tested at 375° F. for 24 hours (see Table 3). A comparison of the antioxidant performance of the products of Examples 1 and 2 with the base oil and the base oil containing a 1% concentration of a known detergent/ashless dispersant which is a polyalkenylbissuccinimide of tetraethylenepentamine (Bissuccinimide of TEPA) in the same mineral oil is presented in Table 1. Table 2 presents a comparison between the products of Examples 3 and 4 with the base oil.

In the Catalytic Oxidation Test, the products of Examples 1–4 are blended into a mineral oil sample and evaluated for oxidative stability. The tests are run at 325° F. for 40 hours and 72 hours and at 375° F. for 24 hours. The test procedure consists of subjecting a volume of the test lubricant to a stream of air which is bubbled through the test composition at a rate of about 5 liters per hour for the specified number of hours and at the specified temperature. Present in the test composition are metals frequently found in engines, namely:

1) 15.5 square inches of a sand-blasted iron wire;
2) 0.78 square inches of a polished copper wire;
3) 0.87 square inches of a polished aluminum wire; and
4) 0.107 square inches of a polished lead surface.

The results of the test are presented in terms of change in kinematic viscosity (KV), change in titrated acid number (TAN) and lead loss. Essentially, the small change in KV means that the lubricant resists oxidative degradation under high temperatures, the small change in TAN indicates that the oil maintains its acidity level under oxidizing conditions which indicates the lubricant's ability to resist oxidative degradation and the small change in lead loss indicates that the additive imparts improved metal surface protection to the lubricant under conditions which tend to promote metal corrosion, such as high temperatures and oxidizing conditions.

TABLE 1

| Additive | Catalytic Oxidation Test | | | | |
|---|---|---|---|---|---|
| | Temp (°F.) | Time (hours) | TAN | KV % | Lead Loss (gm) |
| None | 325 | 40 | 15.30 | 322.29 | 228.5 |
| | 325 | 72 | 16.27 | 334.92 | 246.1 |
| Bissuccinimide of TEPA | 325 | 40 | 15.57 | 332.23 | 291.2 |
| | 325 | 72 | 16.80 | 364.06 | 194.4 |
| Example 1 | 325 | 40 | 7.62 | 91.62 | 34.0 |

TABLE 1-continued

| Additive | Catalytic Oxidation Test | | | | |
|---|---|---|---|---|---|
| | Temp (°F.) | Time (hours) | TAN | KV % | Lead Loss (gm) |
| | 325 | 72 | 8.52 | 178.35 | 3.1 |
| Example 2 | 325 | 40 | 6.24 | 103.84 | 1.6 |
| | 325 | 72 | 7.68 | 107.29 | 0.8 |

A comparison of the test results demonstrates that the base oil containing the salicylic acid-derivatized additives display significantly reduced oxidation (KV), acidity (KV) and corrosion (lead loss) relative to the bissuccinimide in a base stock or the base stock without the additive.

A second product evaluation is conducted using the thiosalicylic acid derivatized products. The results of this test are presented in the following Table 2.

TABLE 2

| Additive | Catalytic Oxidation Test | | | | |
|---|---|---|---|---|---|
| | Temp (°F.) | Time (hours) | TAN | KV % | Lead Loss (gm) |
| None | 325° F. | 40 | 11.90 | 216 | 125.6 |
| | 325° F. | 72 | 17.55 | 283 | 191.6 |
| Example 3 | 325° F. | 40 | 4.52 | 98 | 1.8 |
| | 325° F. | 72 | 5.73 | 107 | 1.2 |
| Example 4 | 325° F. | 40 | 4.43 | 88 | 1.0 |
| | 325° F. | 72 | 5.54 | 106 | 1.0 |

A comparison of the results of the products of Examples 3 and 4 in the Catalytic Oxidation Test shows that the thiosalicylic acid-derived products are extremely effective antioxidants and protect metal surfaces from the effects of oxidizing conditions when compared to the base oil under the same conditions.

The following Table 3 presents the performance results of the products of Examples 3 and 4 (the thiosalicylic acid-derivatives) in the Catalytic Oxidation Test which is conducted at a higher temperature (375° F.) over a shorter time frame (24 hours). This test is conducted to evaluate the performance of the instant additives under conditions experienced by marine diesel engine lubricants. The instant additives perform extremely well as shown by a comparison of the performance results between a marine diesel engine lubricant, fully formulated with a marine lubricant additive package which contains a commercial antioxidant, antiwear agent and other performance improving additives such as detergent and load carrying additives, without the instant additive, and the same lubricant containing an additional 4% concentration by weight of the additives of Examples 3 and 4.

TABLE 3

| Catalytic Oxidation Test (375° F., 24 hours) | |
|---|---|
| Additive | % Change KV |
| None | 133 |
| Example 3 | 97 |
| Example 4 | 85 |

The products of Examples 3 and 4 are tested for their ability to resist corrosion of copper in the Copper Strip Corrosivity Test. The results of this test are reported in Table 4. The test consists of immersing a polished copper strip in a given quantity of a sample of the test composition. The sample is heated to 250° F. At the end of 3 hours the copper strip is removed, washed and compared with the ASTM Copper Strip Corrosion Standards. The Corrosion Standards consist of color reproductions of typical test strips representing increasing degrees of tarnish and corrosion which are noted in accordance with four specific classifications which range from 1, the highest score representing slight tarnish, to 4, the lowest score representing actual corrosion. The suffix designation describes the color of the strip. An "A" suffix represents a light orange strip which is almost the same as a freshly polished strip. The corrosivity ratings attained by the test compositions are reported in Table 4.

TABLE 4

| Copper Strip Corrosivity Test (270° F., 3 hours) | |
|---|---|
| Additives | Copper Strip |
| None | 1A |
| Example 3 | 1A |
| Example 4 | 3A |

What is claimed is:

1. A fuel composition comprising a major amount of a fuel and a minor multifunctional additive, ashless detergent, antioxidant and metal-surface protecting amount of a reaction product of a hydrocarbylsuccinimide dimer, an aldehyde and a heteroatom-substituted benzoic acid which has the following structural formula:

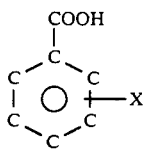

where X is the heteroatomic group which is a hydroxyl, thiol or a primary or secondary nitrogenous group represented by $NH_2$ or $NHR_2$ where $R_2$ is a hydrocarbon group.

2. The composition of claim 1 in which the heteroatom substituted benzoic acid further comprises at least one hydrocarbon substituent group bonded to the benzene nucleus of the benzoic acid, the hydrocarbon group containing 1 to 60 carbon atoms which is an alkyl, aryl, alkenyl, aralkyl, or alkaryl group.

3. The composition of claim 1 in which the hydrocarbylsuccinimide is derived from two equivalent amounts of a hydrocarbylsuccinic anhydride and one molar amount of an alkylenepolyamine compound having the following structural formula:

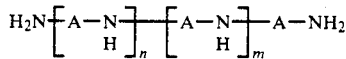

where A is an alkylene group, n and m are integers where n ranges from 0 to 7 and m ranges from 1 to 8.

4. The composition of claim 1 in which the hydrocarbylsuccinimide dimer is derived from two equivalent amounts of the reaction product of a hydrocarbylsuccinic anhydride and one molar amount of an amine selected from the group consisting of aromatic polyamines, in which at least one aromatic group is substituted directly onto the amine group, phenylenealkyleneamines in which the alkylene group is part of an aromatic system and heterocyclic amines in which the amine group is bound to a cyclic system containing at least one heteroatom which is oxygen, sulfur or nitrogen and the heterocyclic amine is a substituent of an alkylenepolyamine or phenylenepolyamine.

5. The composition of claim 3 in which the hydrocarbylsuccinimide is derived from maleic anhydride and an olefin such as ethylene, propylene, isopropylene, butylene, isobutylene, pentylene, hexylene, heptylene, decylene, dodecylene and eicosene, higher olefinic hydrocarbons, polymers of said olefins and copolymers of said olefins.

6. The composition of claim 5 in which the alkylenepolyamine is diethylenetriamine, triethylenetetramine, tetraethylenepentamine and pentaethylenehexamine.

7. The composition of claim 1 in which the aldehyde is paraformaldehyde, formaldehyde, salicylaldehyde, acetaldehyde, propionaldehyde, benzaldehyde, butyraldehyde, hexaldehyde and heptaldehyde.

8. The composition of claim 1 in which the hydrocarbylsuccinimide, the aldehyde and the heteroatom-substituted benzoic acid react in a mole ratio of hydrocarbylsuccinimide to aldehyde to heteroatom-substituted benzoic acid of 1:0.1:0.1 to 1:4:4.

9. The composition of clam 1 in which the reactants are contacted at temperatures ranging from 80° C. to 200° C.

10. A method of making a fuel comprising blending a major amount of a fuel and a minor multifunctional ashless detergent, antioxidant and metal-surface protecting amount of a reaction product of a hydrocarbylsuccinimide dimer, an aldehyde and a heteroatom-substituted benzoic acid which has the following structural formula:

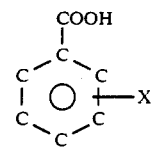

where X is the heteroatomic group which is a hydroxyl, thiol or a primary or secondary nitrogenous group represented by $NH_2$ or $NHR_2$ where $R_2$ is a hydrocarbon group.

11. The composition of claim 1 in which the reaction product is blended with the fuel in an amount ranging from 25 pounds to 500 pounds of additive per 1000 barrels of fuel.

* * * * *